United States Patent
Matsumoto (10) Patent No.: US 10,411,529 B2
(45) Date of Patent: Sep. 10, 2019

(54) STATOR (71) Applicant: TOYOTA JIDOSHA KABUSHIKI KAISHA, Toyota-shi, Aichi-ken (JP)

(72) Inventor: Takashi Matsumoto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 387 days.

(21) Appl. No.: 15/296,640

(22) Filed: Oct. 18, 2016

(65) Prior Publication Data

US 2017/0110916 A1   Apr. 20, 2017

(30) Foreign Application Priority Data

Oct. 20, 2015  (JP) ................. 2015-206494

(51) Int. Cl.
| | |
|---|---|
| *H02K 3/00* | (2006.01) |
| *H02K 1/14* | (2006.01) |
| *H02K 3/18* | (2006.01) |
| *H02K 3/34* | (2006.01) |
| *H02K 3/52* | (2006.01) |

(52) U.S. Cl.
CPC .............. *H02K 1/146* (2013.01); *H02K 3/18* (2013.01); *H02K 3/34* (2013.01); *H02K 3/522* (2013.01)

(58) Field of Classification Search
CPC ....................................................... H02K 3/28
USPC ........................................................ 310/180
See application file for complete search history.

(56) References Cited

U.S. PATENT DOCUMENTS

| | | | |
|---|---|---|---|
| 8,230,580 B2* | 7/2012 | Kiyono | H02K 15/12 29/596 |
| 8,350,427 B2 | 1/2013 | Sugiyama et al. | |
| 9,837,869 B2* | 12/2017 | Hashimoto | H02K 3/18 |
| 10,063,118 B2* | 8/2018 | Yoshida | H02K 3/325 |
| 2010/0187918 A1* | 7/2010 | Takahashi | H02K 1/148 310/43 |
| 2011/0215660 A1* | 9/2011 | Goto | H02K 3/24 310/53 |
| 2015/0008769 A1* | 1/2015 | Uchitani | H02K 3/522 310/43 |
| 2015/0162793 A1* | 6/2015 | Hashimoto | H02K 3/18 310/208 |
| 2016/0043604 A1* | 2/2016 | Yoshida | H02K 3/325 310/71 |
| 2016/0149454 A1* | 5/2016 | Haga | H02K 3/28 310/71 |

(Continued)

FOREIGN PATENT DOCUMENTS

| | | |
|---|---|---|
| JP | 2002-051486 A | 2/2002 |
| JP | 2005-318692 A | 11/2005 |
| JP | 2009-050048 A | 3/2009 |

(Continued)

*Primary Examiner* — Alexander Talpalatski
(74) *Attorney, Agent, or Firm* — Sughrue Mion, PLLC (57) ABSTRACT

A stator includes a yoke, teeth, insulating members, a first ribs, coils, annular members and adhesive bodies. The insulating members each have circumferential wall and a flange. The flange includes a plate wall. The first ribs protrude from the respective flanges. The coils each wound on the outsides of the circumferential wall and the first ribs of each of the teeth. The annular members close teeth distal end sides of cavities. A first hole and a second hole are provided in the plate wall. The turning passage contains varnish charged through the injection hole.

2 Claims, 12 Drawing Sheets (56) References Cited

U.S. PATENT DOCUMENTS

2016/0241093 A1* 8/2016 Patel .................. H02K 3/24

FOREIGN PATENT DOCUMENTS

| JP | 4339027 B2 | 10/2009 |
| JP | 2014-155369 A | 8/2014 |

* cited by examiner

STATOR

INCORPORATION BY REFERENCE

The disclosure of Japanese Patent Application No. 2015-206494 filed on Oct. 20, 2015 including the specification, drawings and abstract is incorporated herein by reference in its entirety.

BACKGROUND

1. Technical Field

The present disclosure relates to the structure of a stator.

2. Description of Related Art

Japanese Patent Application Publication No. 2002-51486 discloses a rotor of a motor or a generator. The rotor is structured such that windings are wound around teeth of a rotor core formed by lamination with an insulating member acting as a bobbin interposed between the windings and the teeth and the shape of the windings are set by applying an encapsulant of a resin onto the outer periphery of the windings or by potting a resin onto the outer periphery of the windings, for example.

Japanese Patent Application Publication No. 2014-155369 and Japanese Patent Application Publication No. 2005-318692 disclose a stator of a motor or a generator. The stator includes a stator core formed by laminating steel sheets and having a cylindrical yoke and a plurality of teeth protruding radially inward from the yoke and a coil wire is wound around each of the teeth to form a coil. The coil wire wound around the teeth partly forms coil ends protruding axially outward from both axial end surfaces of the stator core. In such a stator, varnish is dropped from the outer surfaces of the coil ends to penetrate in between loops of the coil wire, thereby setting the shape between the loops or of the entire coils and improving the insulating property.

A method of fastening coils to a stator core and improving the insulating property is proposed in which, in the stator, coil ends are covered with molds for injecting a resin and the coil ends are resin molded (e.g., Japanese Patent Application Publication No. 2009-50048).

SUMMARY

When a coil wire is wound on the periphery of a resin member and form a coil around each of teeth, an insulating member, which is mounted on an outer peripheral surface of each of the teeth having a rectangular sectional shape, sometimes has a tetragonal tube-shaped cross-section for closer contact between the insulating member and the outer surface of the tooth. The coil wound around the insulating member having the tetragonal tube-shaped cross-section has an elliptical cross-section that is long in the axial direction due to restriction of the minimum bend radius of the coil wire. This may form a cavity between an axial outer surface of the insulating member and the inner surface of a coil end. The varnish dropped from the outer surfaces of the coil ends to penetrate in between the loops of the coils as described above may not sufficiently fill the inner cavity, possibly leading to insufficient fastening between the coil ends and the insulating member. Also, the method involving covering the coil ends with molds for injecting a resin and injecting the resin into the inside of the coil ends and the cavity needs preparation of the molds and a high-pressure resin injection apparatus, possibly complicating the manufacturing process and consuming more time during the manufacture.

The disclosure provides a stator that improves adhesion between a coil and an insulating member with a simple structure.

A first example aspect of the disclosure provides a stator. The stator includes a yoke, teeth, insulating members, at least one first rib, coils, annular members, and an adhesive body. The yoke extends in a circumferential direction of the stator. The teeth protrude radially from an inner circumferential surface of the yoke. The insulating members each include walls and a flange. The walls cover at least part of circumferential end surfaces of each of the teeth. The flange includes a plate wall. The plate wall extends outward at least beyond respective axial end surfaces of each of the teeth on an inner circumferential surface side of the yoke, the plate wall having a first hole and a second hole. The first rib protrudes radially inward from the plate wall outside the axial end surface of each of the teeth. The first rib is provided between the first hole and the second hole. The first hole and the second hole are provided in the plate wall such that the second hole is circumferentially spaced from the first hole across the first rib, the first rib constituting a passage that connects the first hole and the second hole. Each of the coils wound on outsides of the walls and the first rib. The annular members are attached to teeth distal end-side portions of the axial end surface of the teeth. The annular members close teeth distal end-side openings of cavities. The cavities are disposed between the axial end surfaces of the teeth and inner surfaces of the coils. The adhesive body is filled in the passage. The plate wall closes a yoke-side opening of the cavity. The first rib extends radially from the plate wall toward the annular member such that the first rib does not reach the annular member.

According to the configuration, the adhesive body charged into the turning passage disposed in the cavity between the outer surface of the insulating member and the inner surface of the coil closely contacts with the outer surface of the insulating member and the inner surface of the coil to enhance the adhesion between the coil and the insulating member.

The stator may further includes at least one second rib. In the stator, a plurality of the first ribs may be provided between the first hole and the second hole. The second rib may be provided between the first ribs. The second rib may extend radially from the annular member toward the yoke such that the second rib does not reach the plate wall. The first ribs and the second rib may together constitute the passage that connects the first hole and the second hole.

According to the configuration, even an adhesive body having a high viscosity can closely contact with the outer surface of the insulating member and the inner surface of the coil to bond the coil with the insulating member more firmly.

According to the configuration, the adhesion between the coil and the insulating member can be enhanced with the simple configuration.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
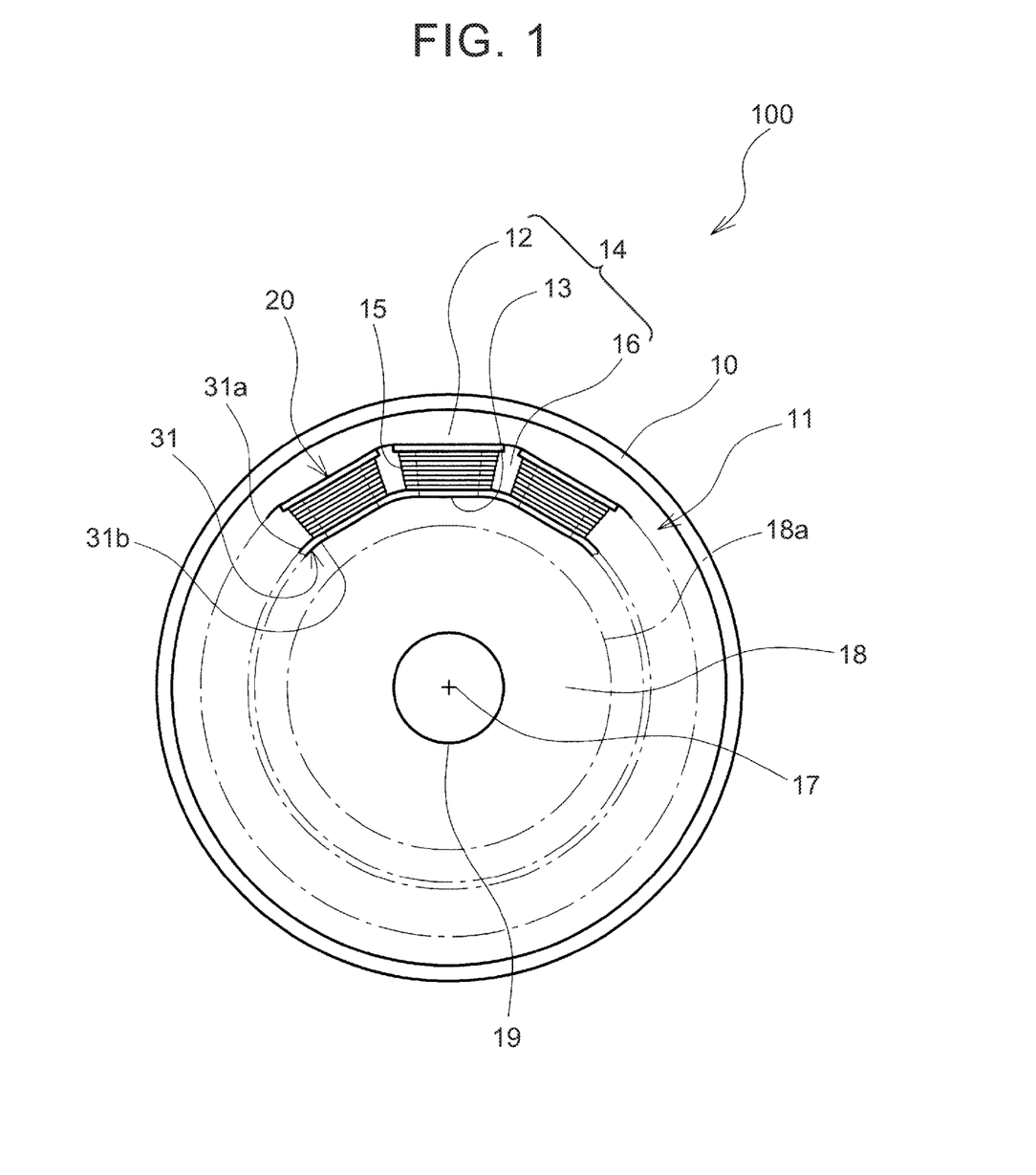
FIG. 1 is a sectional plan view of a motor having a stator of an embodiment.

Hereinafter, an embodiment will be described with reference to the drawings. First, referring to FIG. 1, a motor 100 having a stator 11 of the embodiment will be described briefly. As shown in FIG. 1, the motor 100 includes a cylindrical casing 10, the stator 11, and a rotor 18. The stator 11 is mounted on an inner surface of the casing 10. The rotor 18 rotates together with a rotating shaft 19 about a rotation center 17 inside the stator 11. The stator 11 includes a stator core 14, insulating members 20 and a plurality of concentratedly wound coils 15. The stator core 14 includes an annular yoke 12, a plurality of teeth 13, and a plurality of slots 16. The plurality of teeth 13 protrudes radially from an inner circumferential surface 12b of the yoke 12 toward the rotation center 17. The plurality of slots 16 is each provided between each adjacent teeth 13. The insulating members 20 cover an outer surface of the respective teeth 13 and the inner circumferential surface 12b of the yoke 12. The plurality of concentratedly wound coils 15 wound around a periphery of the respective insulating members 20 covering the teeth 13, through the slots 16. Here, the stator core 14 is formed by laminating magnetic steel sheets. Annular members 31 are placed on surfaces of the coils 15 close to distal ends of the teeth 13. The rotor 18 is provided with a permanent magnet on an outer circumferential surface 18a. As an electric power is supplied to the coils 15 of the stator 11, the rotor 18 is rotated due to the resulting magnetic force in the coils 15 and a magnetic force of the permanent magnet, and then a rotation output is taken out from the rotating shaft 19 to the outside.

Figure 2:
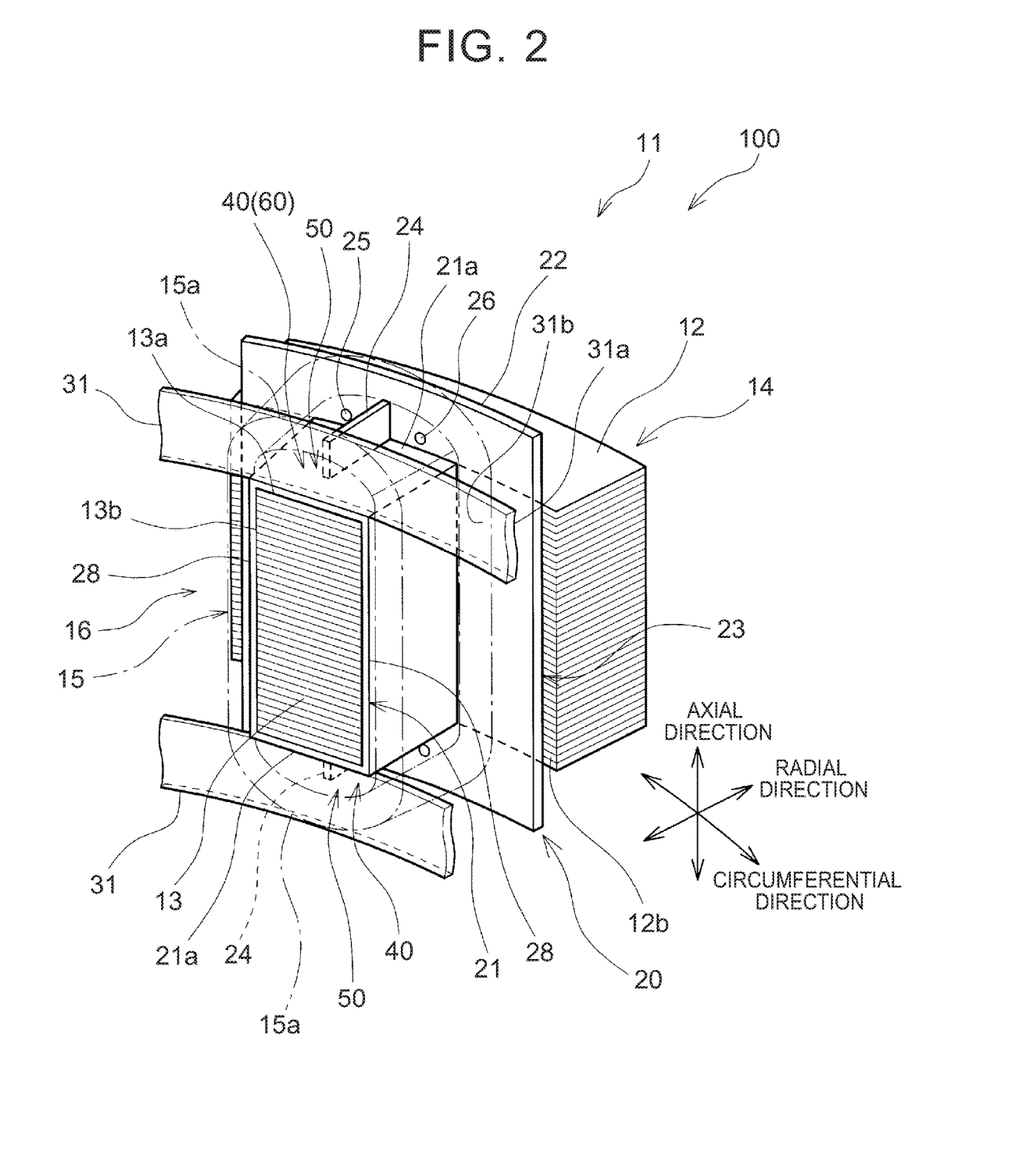
FIG. 2 is a partial perspective view of the stator of the embodiment.
Figure 3:
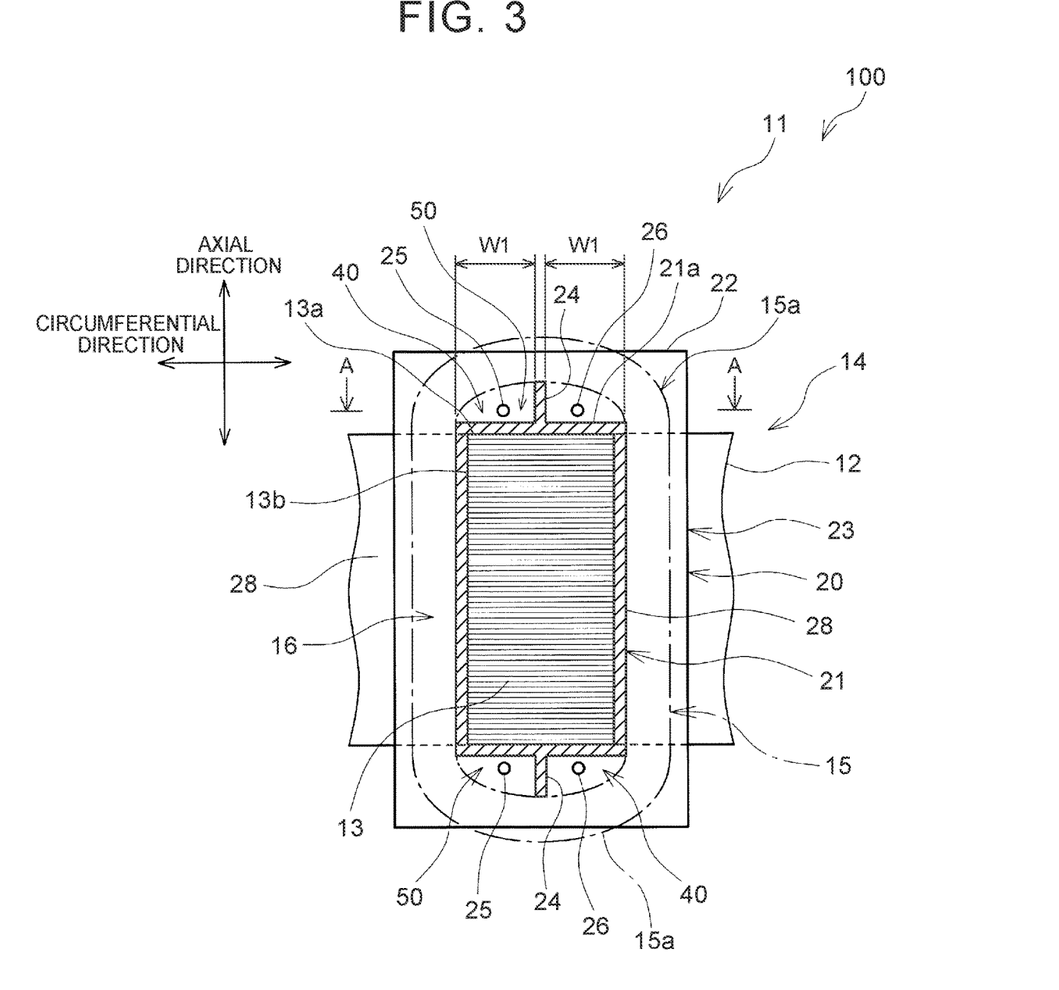
FIG. 3 is a circumferential development of the stator of the embodiment illustrating cross-sections of a teeth and an insulating member, a yoke, and a coil as seen from an inner side of the stator.

As shown in FIG. 2, the teeth 13 protruding from the yoke 12 extending in a circumferential direction of the stator 11 are formed by laminating magnetic steel sheets such that the teeth 13 each have a rectangular cross-section, and the teeth 13 each have the insulating member 20 made of resin attached on the outer surface of the tooth 13. Each insulating member 20 includes a tubular portion 21 and a plate-shaped flange 23. The tubular portion 21 covers axial end surfaces 13a of the tooth 13 and circumferential end surfaces 13b of the tooth 13. The plate-shaped flange 23 extends outward from an edge of a yoke 12-side opening of the tubular portion 21. The tubular portion 21 has ribs (an example of first ribs) 24 protruding axially outward from respective axial outer surfaces 21a of the tubular portion 21. The coil 15 is wound outside the circumferential wall portions 28 and the axial outer surfaces 21a of the tubular portion 21 and the ribs 24. As shown in FIGS. 2 and 3, portions of the coil 15 fitted inside the slots 16 along the circumferential wall portions 28 of the tubular portion 21 are formed in a linear shape along the circumferential wall portions 28, and an inner side of the coil 15 abuts against the circumferential wall portions 28. At the same time, coil ends 15a of the coil 15 that protrude axially outwardly beyond the axial outer surfaces 21a of the tubular portion 21 are separated from the axial outer surfaces 21a and bowed. As shown in FIGS. 2 and 3, between an inner surface of each coil end 15a and the corresponding axial end surface 13a of the tooth 13 is formed a cavity 40 having an approximately half-oval cross-section. The cavity 40 extends radially in a direction in which the corresponding tooth extends, with the axial outer surface 21a interposed between the inner surface of the coil end 15a and the axial end surface 13a. The cavity 40 has openings both on the tooth 13 distal end side and the yoke 12 side. A yoke 12-side surface of the coil 15 abuts against a surface of the flange 23 of the insulating member 20, so that the yoke 12-side opening of the cavity 40 is closed by a plate wall portion 22 of the flange 23 that extends axially outwardly of the yoke 12.

Figure 4:
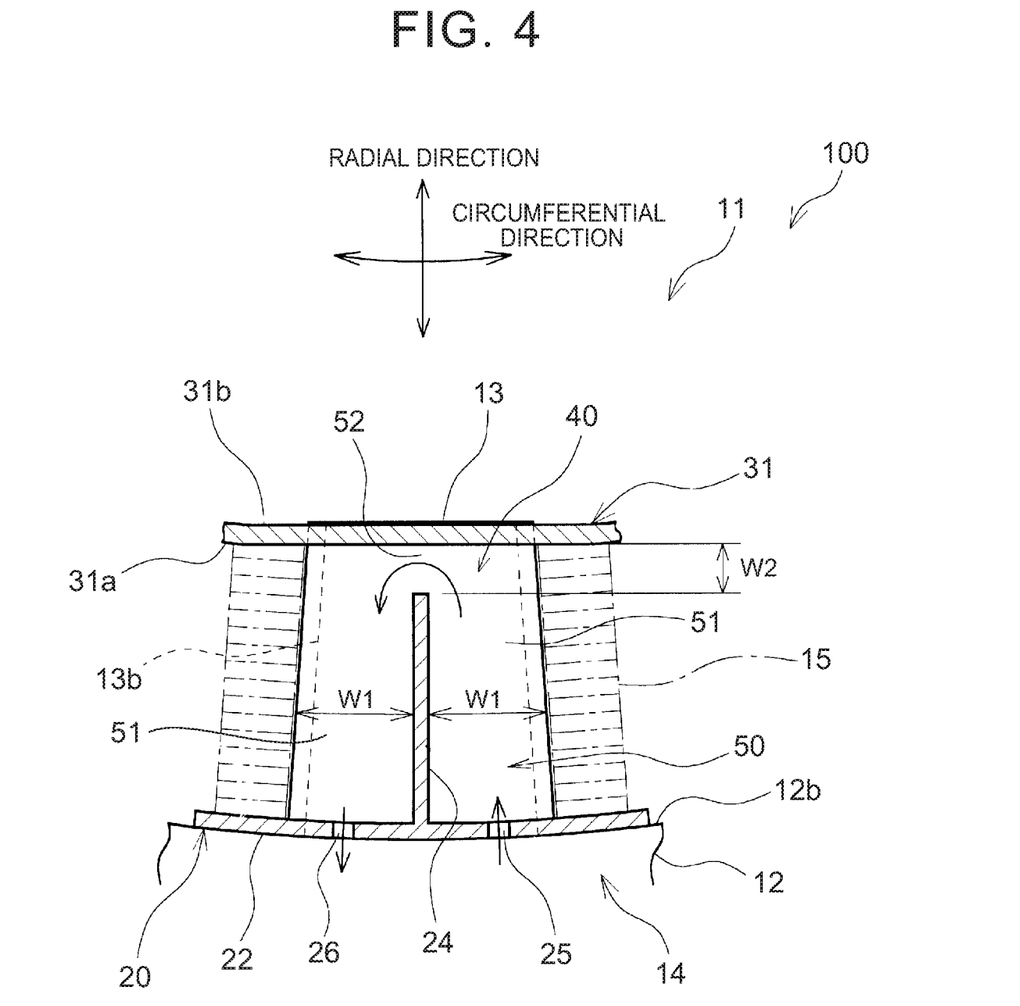
FIG. 4 is a sectional plan view of the stator of the embodiment (taken along the line A-A in FIG. 3), illustrating the configuration of a cavity between an axial outer surface of the insulating member and an inner surface of the coil.

As shown in FIGS. 2 and 4, each annular member 31 is an annular strip. A widthwise end surface of the annular member 31 is attached to the axial outer surface 21a of the tubular portion 21 close to the distal end of the tooth 13, and an outer circumferential surface 31a of the annular member 31 abuts against the tooth 13 distal end-side surface of the coil 15. As a result, the annular member 31 closes the tooth 13 distal end-side opening of the cavity 40. Here, the annular member 31 is attached to the axial outer surface 21a of the tubular portion 21 such that an inner circumferential surface 31b of the annular member 31 does not protrude beyond the distal end of the tooth 13 toward the rotor 18, and thus the annular member 31 will not interfere with the rotor 18. As shown in FIGS. 2 and 4, the rib 24 placed at the center of the cavity 40 extends radially inwardly from the plate wall portion 22 toward the annular member 31 and terminates short of the annular member 31, and the rib 24 divides a U-shaped turning passage 50. As shown in FIG. 4, the turning passage 50 is divided by the rib 24 and the inner surface of the coil 15 and formed by radial passages 51 and a connecting passage 52. The radial passages 51 each extend radially inwardly from the plate wall portion 22 toward the annular member 31 and has a width W1. The connecting passage 52 is formed by a radial end of the rib 24 and an inner surface of the annular member 31 and connects the two radial passages 51, and the connecting passage 52 has a width W2. In the embodiment, the width W2 is narrower than the width W1.

As shown in FIGS. 2 and 4, the plate wall portion 22 has an injection hole 25 which communicates with one of the radial passages 51 inside the cavity 40 and through which varnish 60, an adhesive body, is injected into the cavity 40, and also has an air vent 26 which is circumferentially spaced from the injection hole 25 across the rib 24 and communicates with the other radial passage 51 inside the cavity 40 and through which air inside the cavity 40 is discharged. In this way, the turning passage 50 is a U-shaped passage formed by partitioning the cavity 40 with the rib 24 and connecting the injection hole 25 and the air vent 26. The air vent 26 is formed on the opposite side of the turning passage 50 from the injection hole 25.

Figure 5:
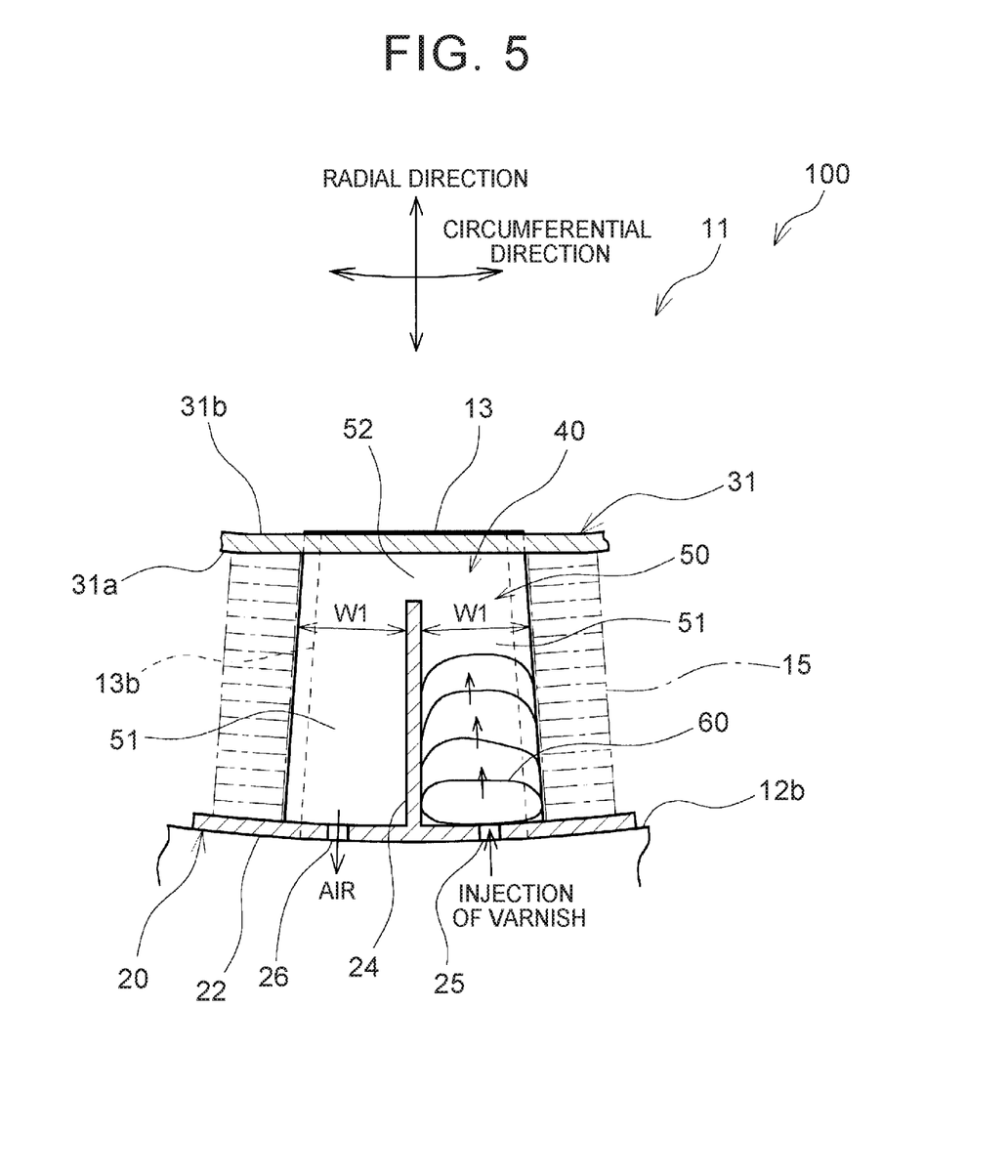
FIG. 5 is an illustration describing a state of a turning passage inside the cavity between the axial outer surface of the insulating member and the inner surface of the coil of the stator of the embodiment immediately after start of injection of varnish into the turning passage.
Figure 6:
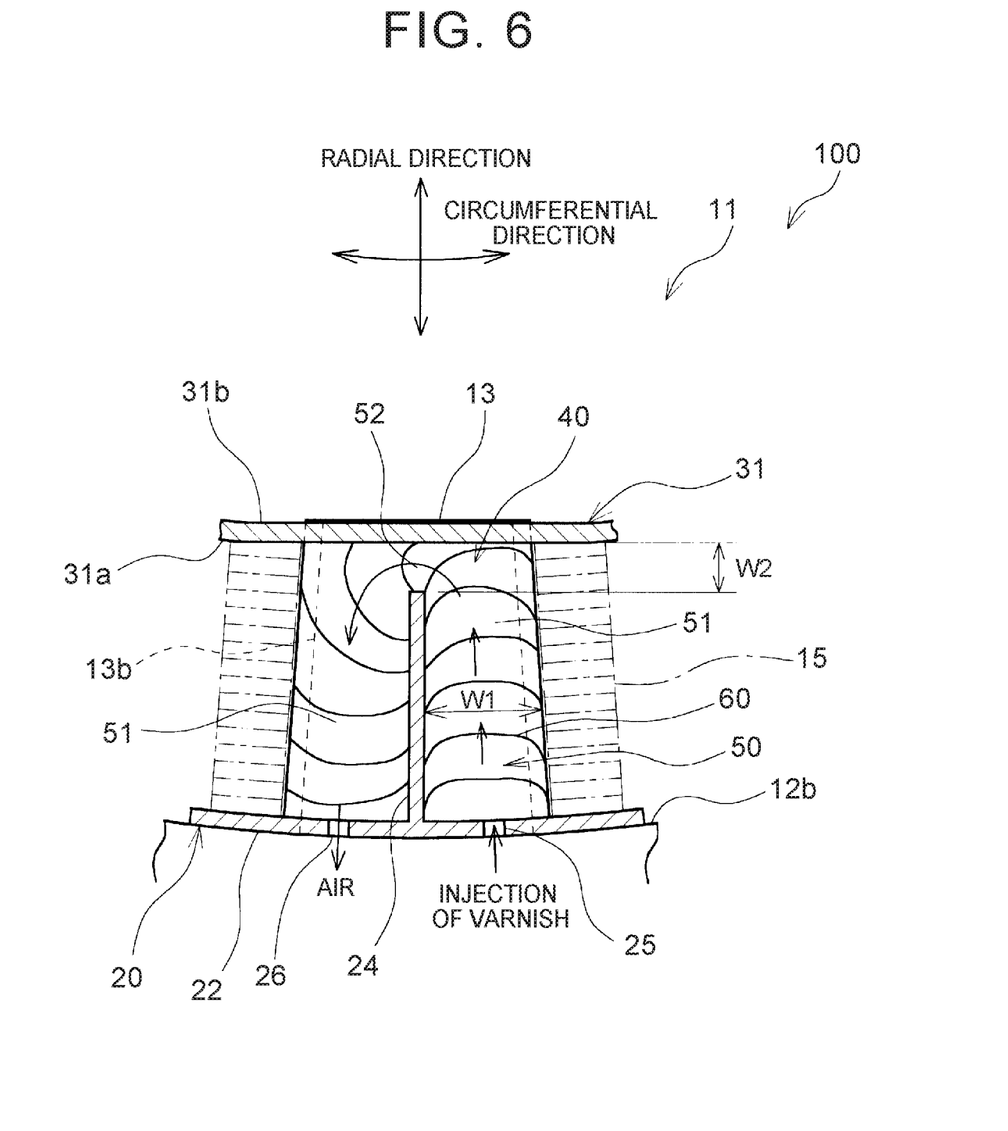
FIG. 6 is an illustration describing a state of the turning passage inside the cavity between the axial outer surface of the insulating member and the inner surface of the coil of the stator of the embodiment immediately before completion of the injection of the varnish into the turning passage.

Next, a description will be given of a step of filling the turning passage 50 with an adhesive body, the varnish 60, having a low to intermediate viscosity (5 to 8 (Pa·s)) with reference to FIGS. 5 and 6. As shown in FIG. 5, when the varnish 60 is injected into one radial passage 51 through the injection hole 25, the varnish 60 expands to fill the width W1 of the radial passage 51 and is charged along the radial passage 51 toward the annular member 31. As the varnish 60 is injected into the radial passage 51 through the injection hole 25, the air inside the turning passage 50 is discharged to the outside through the air vent 26 formed on the opposite side of the turning passage 50. Accordingly, there is no air bubbles left in the varnish 60 charged inside the turning passage 50. When the varnish 60 is further injected, the varnish 60 flows from the radial passage 51 into the connecting passage 52 as shown in FIG. 6. Because the width W2 of the connecting passage 52 is narrower than the width W1 of the radial passage 51, when the varnish 60 reaches the connecting passage 52, the varnish 60 in the one radial passage 51, which is upstream of the connecting passage 52, is pressurized. The pressure causes the varnish 60 to closely contact with an inner surface of the radial passage 51. As shown in FIG. 6, varnish 60 that has flowed through the connecting passage 52 into the other radial passage 51 expands to fill the width W1 of the other radial passage 51 and flows through the radial passage 51 toward the air vent 26. At this time, air inside the other radial passage 51 is discharged to the outside through the air vent 26. Then, it is determined when the varnish 60 is extruded by a small amount through the air vent 26 that the turning passage 50 is fully filled with the varnish 60, and the injection of the varnish 60 is finished. The varnish 60 charged in the turning passage 50 closely contacts with an outer surface of the insulating member 20 and the inner surface of the coil 15, and firmly bonds the coil 15 with the insulating member 20 when hardens.

As described above, the stator 11 of the embodiment allows the cavity 40 between the outer surface of the insulating member 20 and the inner surface of the coil 15 to be filled with the varnish 60, thereby firmly bonding the coil 15 with the insulating member 20. Also, in the stator 11 of the embodiment, the varnish 60 is injected into the turning passage 50 through the injection hole 25 while discharging the air through the air vent 26 formed on the opposite side of the turning passage 50 from the injection hole 25, thereby filling the turning passage 50 with the varnish 60 without leaving any air bubbles, and thus, bring the varnish 60 into close contact with the outer surface of the insulating member 20 and the inner surface of the coil 15. This enhances the adhesion between the coil 15 and the insulating member 20.

In addition, the stator 11 of the embodiment allows an operator to ensure that the cavity 40 is filled with the varnish 60 by visually examining the air vent 26 for the extrusion of the varnish 60, simplifying the examination step. Further, the air vent 26 is formed on the opposite side to the rotor 18, so the extruded varnish 60 will not contact the rotor 18. This eliminates the need for trimming the extruded varnish 60, simplifying the manufacturing step.

Next, another embodiment will be described with reference to FIGS. 7 to 10. Components similar to those described referring to FIGS. 1 to 6 will be designated with similar reference characters and explanations thereof will be omitted.

Figure 7:
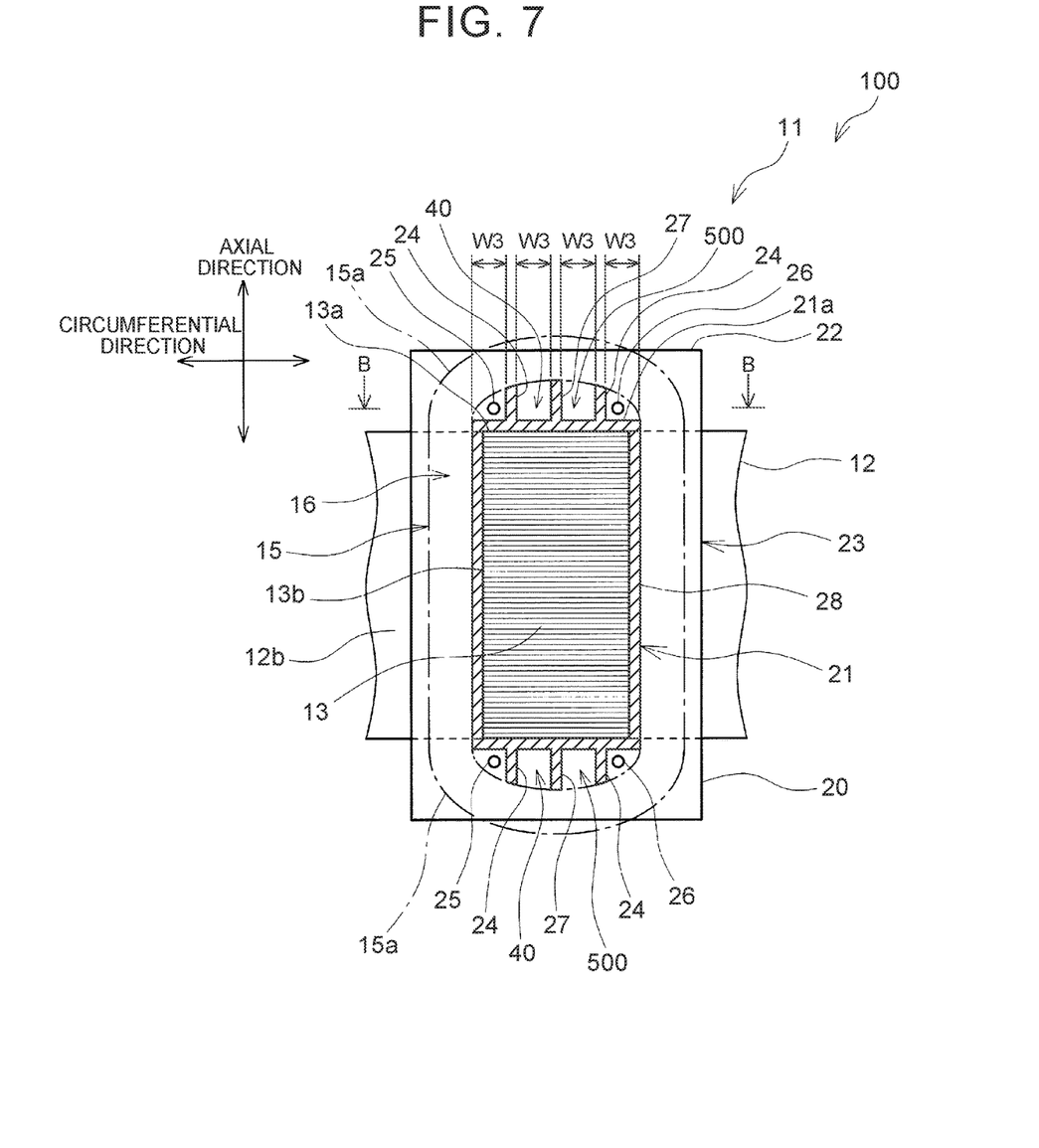
FIG. 7 is a circumferential development of a stator of another embodiment illustrating cross-sections of a tooth and an insulating member, a yoke, and a coil as seen from an inner side of the stator.
Figure 8:
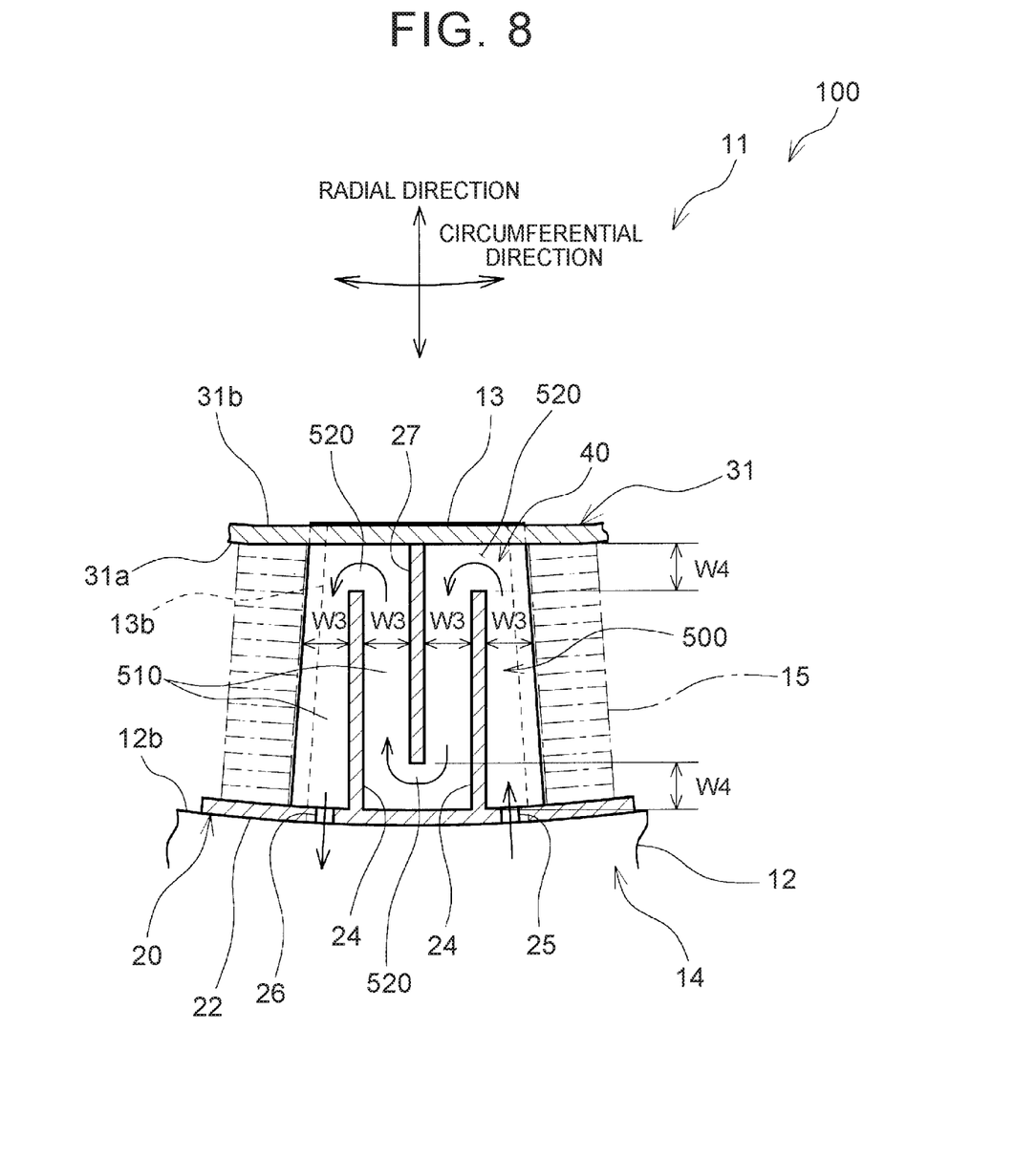
FIG. 8 is a sectional plan view of the stator of the another embodiment (taken along the line B-B in FIG. 7), illustrating the configuration of a cavity between an axial outer surface of the insulating member and an inner surface of the coil.

As shown in FIGS. 7 and 8, in the embodiment, a cavity 40 has therein two ribs 24 extending radially inwardly from a plate wall portion 22 toward an annular member 31 and a second rib 27 placed between the two ribs 24 and extending from the annular member 31 toward a yoke 12. That is, each of teeth 13 is provided with a plurality of ribs 24 and at least one second rib 27. An injection hole 25 is formed on the plate wall portion 22 between one rib 24 and an inner surface of a coil 15, and an air vent 26 is formed on the plate wall portion 22 between the other rib 24 and the inner surface of the coil 15. The two ribs 24 and the second rib 27 form, in the cavity 40, a turning passage 500 including four radial passages 510 and three connecting passages 520 that are connected in a serpentine manner. A width W3 of the radial passage 510 is about one-half the width W1 of the radial passage 51 in the stator 11 of the embodiment that has been previously described with reference to FIGS. 1 to 6. In the stator 11 of the present embodiment, a width W4 of the connecting passage 520 is a little narrower than the width W3 of the radial passage 510.

Figure 9:
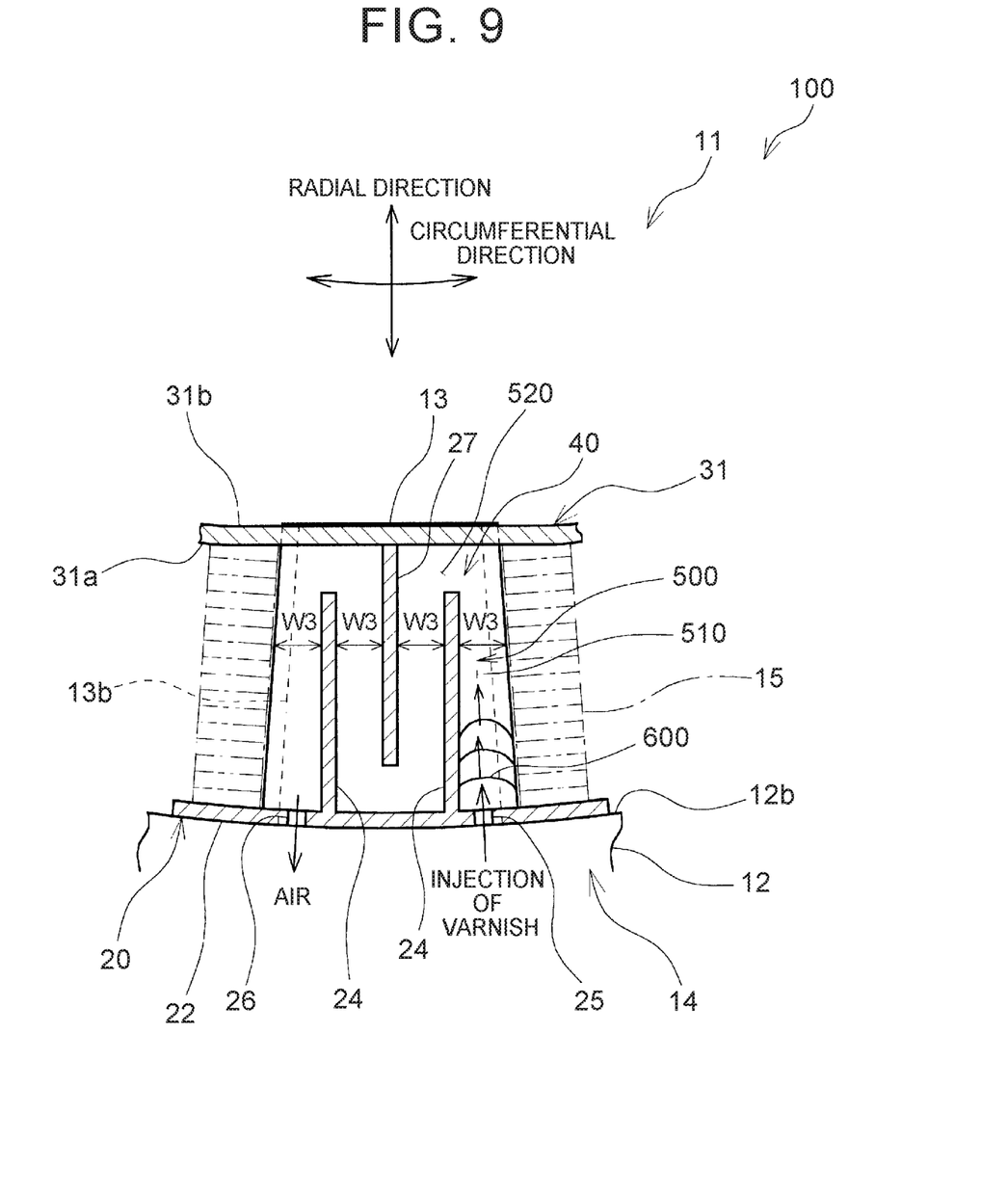
FIG. 9 is an illustration describing a state of a turning passage inside the cavity between the axial outer surface of the insulating member and the inner surface of the coil of the stator of the another embodiment immediately after start of injection of varnish into the turning passage.
Figure 10:
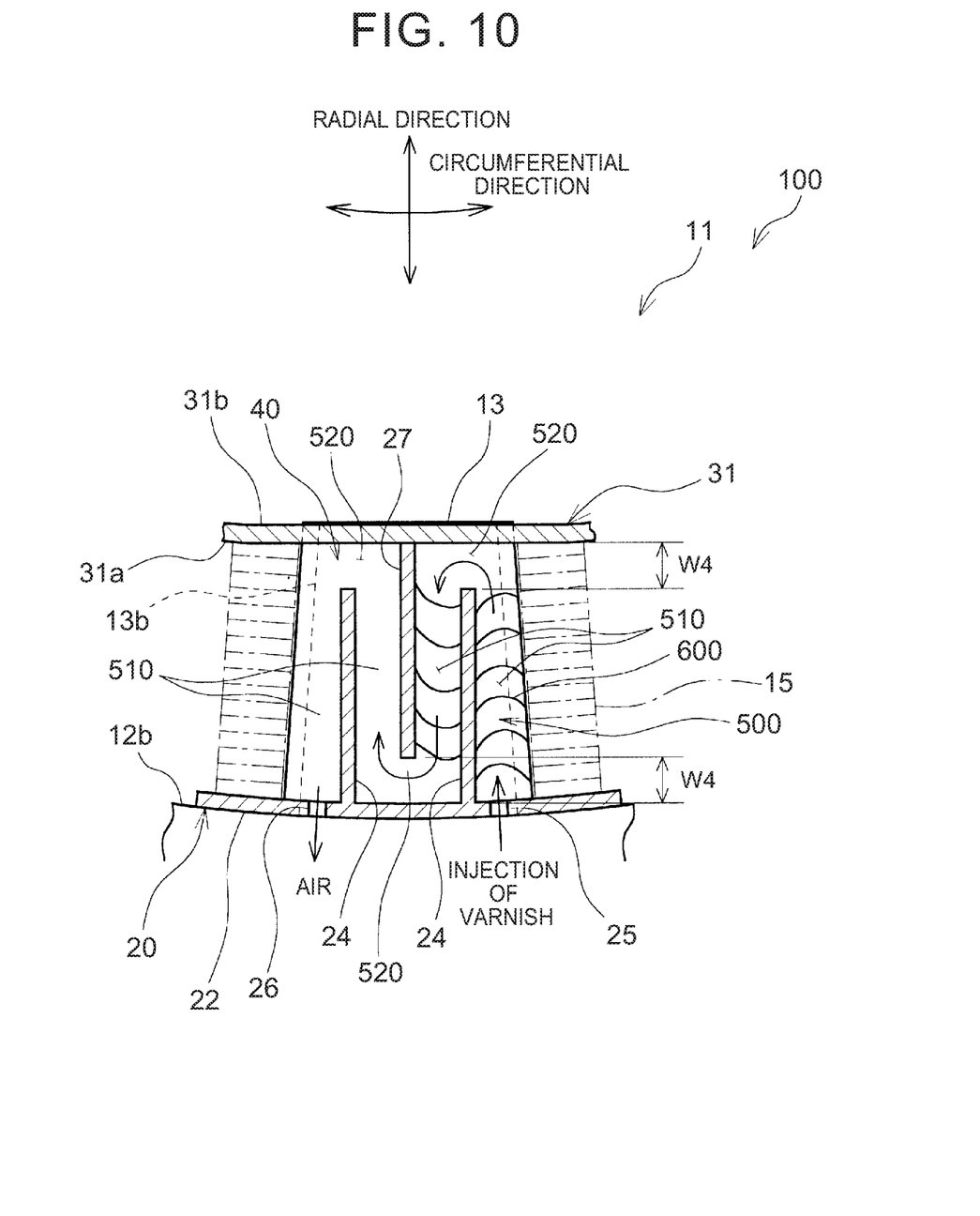
FIG. 10 is an illustration describing a state of the turning passage inside the cavity between the axial outer surface of the insulating member and the inner surface of the coil of the stator of the another embodiment after injection of about one half a total amount of the varnish into the turning passage.

Referring to FIGS. 9 and 10, a description will be given of a step of filling the turning passage 500 with varnish 600 that is more viscous than the varnish 60 described with reference to FIGS. 5 and 6 and has an intermediate to high viscosity (7 to 10 (Pa·s)). When the varnish 600 is injected through the injection hole 25 into the radial passage 51 of the width W1 described with reference to FIGS. 5 and 6, the varnish 600 flows into the radial passage 51 without expanding to fill the width of the radial passage 51. As a result, the air inside the cavity 40 will be trapped in the varnish 600 as air bubbles in the proximity of the injection hole 25, and it can be difficult to fill the radial passage 51 with the varnish 600 having the high viscosity without leaving any air bubbles. Meanwhile, when the varnish 600 having the high viscosity is injected through the injection hole 25 into the narrow radial passage 510, the varnish 600 will be charged into the radial passage 510 while expanding to fill the width of the radial passage 510 as shown in FIG. 9. The air inside the radial passage 510 will be discharged to the outside through the air vent 26. Thus, the varnish 600 can be charged into the radial passage 510 without trapping the air as air bubbles in the proximity of the injection hole 25.

When the varnish 600 is further charged, the varnish 600 flows past the first connecting passage 520 into the second radial passage 510, filling the radial passage 510 from the annular member 31 toward the plate wall portion 22 as shown in FIG. 10. When reaching the second connecting passage 520 in the proximity of the plate wall portion 22, the varnish 600 flows from the second connecting passage 520 into the third radial passage 510. In this way, the varnish 600 injected through the injection hole 25 is charged throughout the turning passage 500 while alternately passing through the radial passage 510 and the connecting passage 520 of the turning passage 500. Then, it is determined when the varnish 600 is extruded by a small amount through the air vent 26 that the turning passage 500 is fully filled with the varnish 600, and the injection of the varnish 600 is finished. The varnish 600 charged in the turning passage 500 closely contacts with an outer surface of an insulating member 20 and the inner surface of the coil 15, and firmly bonds the coil 15 with the insulating member 20 when hardens.

The stator 11 of the embodiment allows the turning passage 500 to be filled with the varnish 600 without leaving any air bubbles in the turning passage 500 by reducing the width W3 of the turning passage 500, even if the varnish 600 has a high adherence and a high viscosity, bringing the varnish 600 into close contact with the outer surface of the insulating member 20 and the inner surface of the coil 15. Thus, it is possible to bond the coil 15 with the insulating member 20 more firmly by using the varnish 600 that has a high adherence and a high viscosity.

While FIGS. 9 and 10 illustrate the step of charging the varnish 600 that is more viscous than the varnish 60 and has the intermediate to high viscosity (7 to 10 (Pa·s)), the varnish 60 having the low to intermediate viscosity (5 to 8 (Pa·s)) can also be injected into the turning passage 500 to fill the turning passage 500 without leaving any air bubbles.

Figure 11:
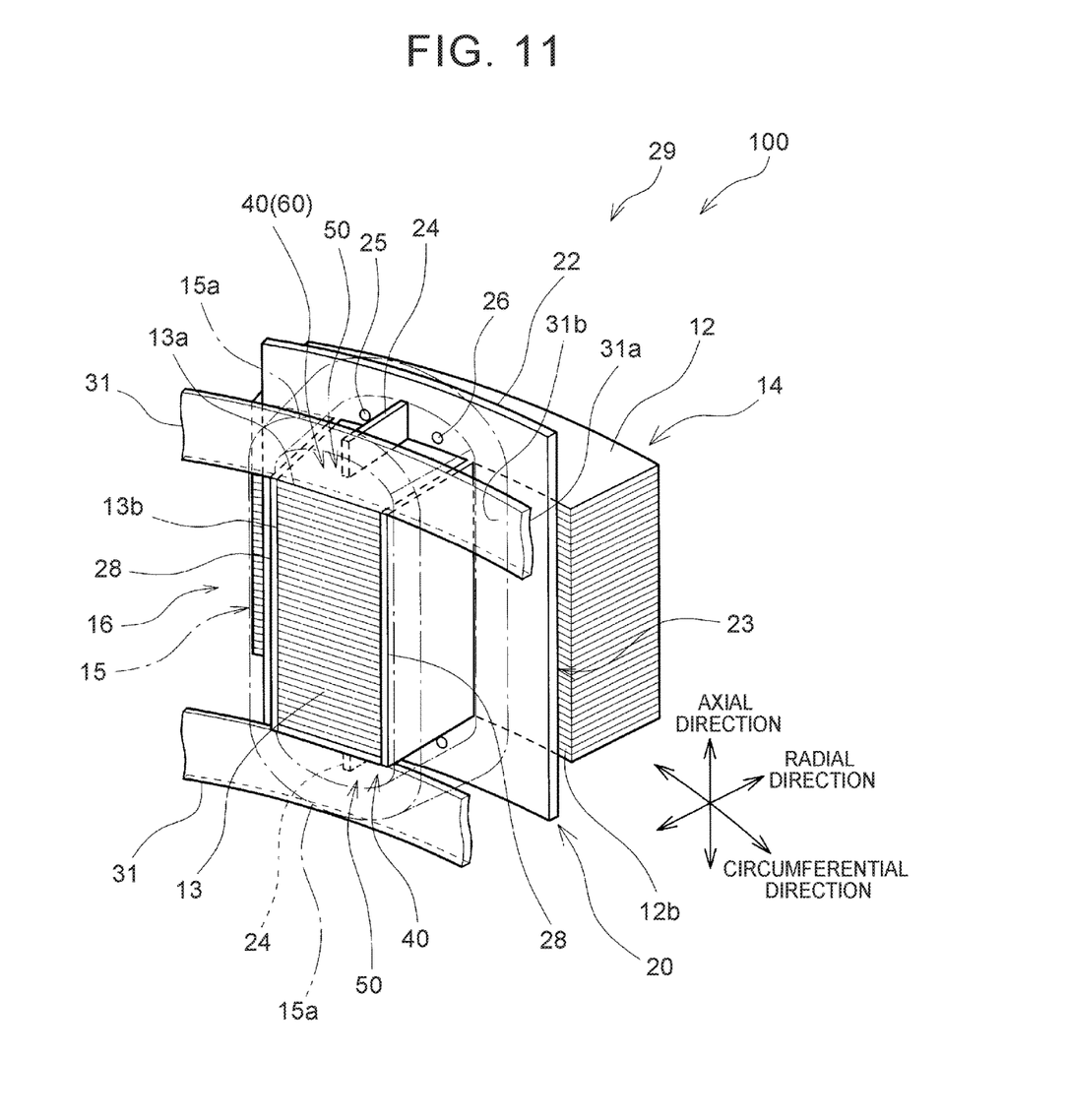
FIG. 11 is a partial perspective view of a stator of a modification of the disclosure.
Figure 12:
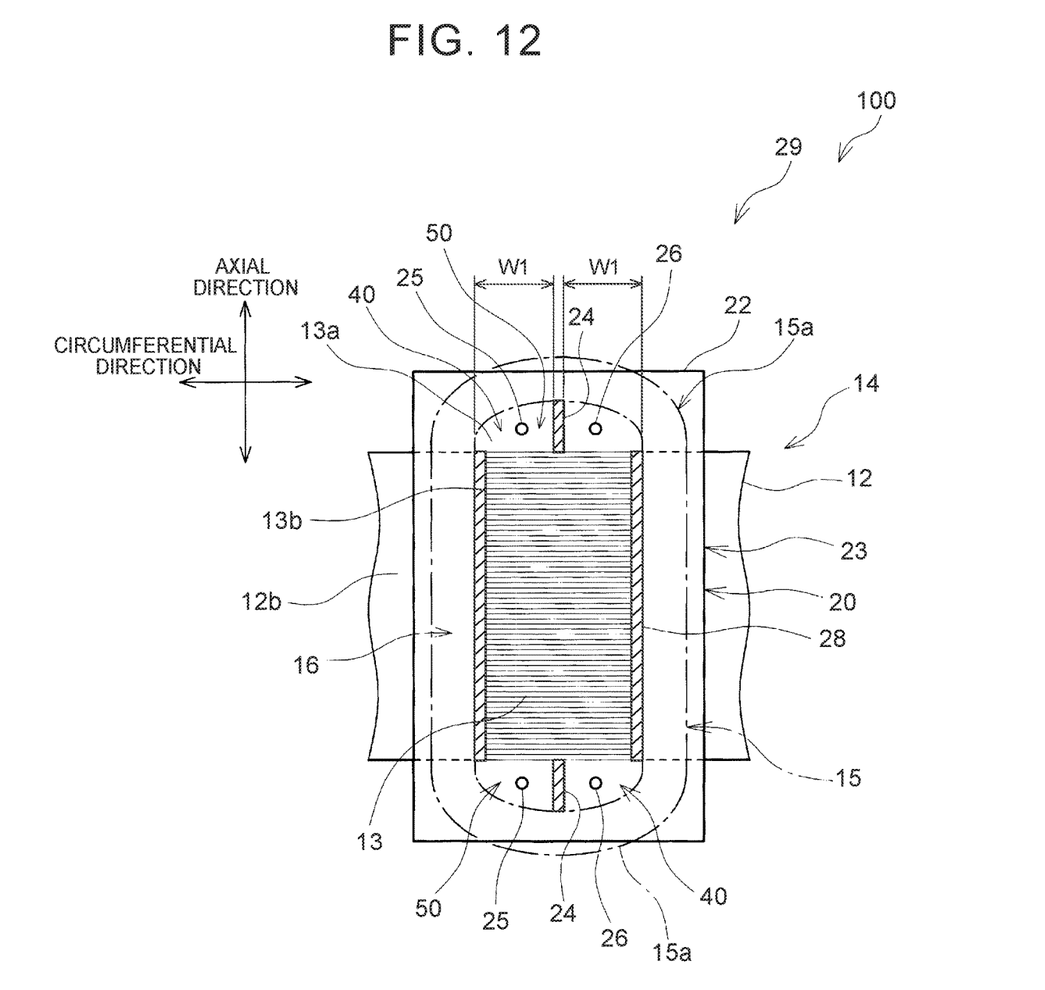
FIG. 12 is a circumferential development of the stator of the modification illustrating cross-sections of a tooth and an insulating member, a yoke, and a coil as seen from an inner side of the stator.

FIGS. 11 and 12 are respectively a partial perspective view and a circumferential development of a stator 29 of a modification of the disclosure illustrating the configuration of the stator 29. In the stator 29, the structures that are the same as those in the above embodiments will be designated with the same reference characters and explanations thereof will be omitted.

In the modification, an insulating member 20 does not cover axial end surfaces 13a of the corresponding tooth 13 and has circumferential wall portions 28 covering circumferential end surfaces 13b. Ribs 24 protrude radially inward (toward the rotor 18) from respective plate wall portions 22 that extend axially outward beyond the axial end surfaces 13a of the tooth 13. Annular members 31 are attached to teeth distal end-side portions of the axial outer surfaces 21a.

In the modification, an axial end surface 13a of the tooth 13 and an inner surface of a coil 15 form a cavity 40. In each of the cavities 40, a rib 24 extends radially from the plate wall portion 22 toward the annular member 31 and terminates short of the annular member 31, and divides a U-shaped turning passage 50. Also, as in the foregoing embodiments, each plate wall portion 22 has an injection hole 25 communicating with the turning passage 50 formed in the cavity 40 and an air vent 26 circumferentially spaced from the injection hole 25 across the rib 24 and communicating with the turning passage 50.

Like in the above embodiments, as varnish 60 is injected through the injection hole 25 into the turning passage 50, air inside the turning passage 50 is discharged through the air vent 26 to the outside, thereby fully filing the turning passage 50 with the varnish 60. That is, the stator 29 allow the cavity 40 formed by the axial end surface 13a of the tooth 13 and the inner surface of the coil 15 to be filled with the varnish 60, thereby firmly bonding the tooth 13, the coil 15, and end portions of the circumferential wall portions 28 of the insulating member 20 with each other. In addition, the varnish 60 can closely contact with the tooth 13, the coil 15, and the end portions of the circumferential wall portions 28 of the insulating member 20. This enhances the adhesion among the tooth 13, the coil 15, and the insulating member 20 while keeping the tooth 13 and the coil 15 electrically insulated from each other.

While in the modification, the insulating member 20 does not cover the axial end surfaces 13a of the tooth 13, the insulating member 20 may be configured to partly cover the axial end surfaces 13a. Further, as long as the tooth 13 and the coil 15 are kept electrically insulated from each other, the circumferential wall portions 28 of the insulating member 20 may be configured not to cover the circumferential end surfaces 13b of the tooth 13 completely but to cover the circumferential end surfaces 13b at least partly.

Like the embodiment previously described with reference to FIGS. 7 and 8, the modification may be configured such that the cavity 40 has therein two ribs 24 extending radially inward from a plate wall portion 22 and a second rib 27 placed between the two ribs 24 and extending from the annular member 31 toward the yoke 12, and that the two ribs 24 and the second rib 27 form, in the cavity 40, a turning passage 500 including four radial passages 510 and three connecting passages 520 that are connected in a serpentine manner.

What is claimed is:

1. A stator comprising:
   a yoke extending in a circumferential direction of the stator;
   teeth protruding radially from an inner circumferential surface of the yoke;
   insulating members each including walls and a flange, the walls covering at least part of circumferential end surfaces of each of the teeth, the flange including a plate wall, the plate wall extending outward at least beyond respective axial end surfaces of each of the teeth on an inner circumferential surface side of the yoke, the plate wall having a first hole and a second hole;
   at least one first rib protruding radially inward from the plate wall outside the axial end surface of each of the teeth, the first rib being provided between the first hole and the second hole, the first hole and the second hole being provided in the plate wall such that the second hole is circumferentially spaced from the first hole across the first rib, the first rib constituting a passage that connects the first hole and the second hole;
   coils each wound on outsides of the walls and the first rib;
   annular members attached to teeth distal end-side portions of the axial end surface of the teeth, the annular members closing teeth distal end-side openings of cavities, the cavities being disposed between the axial end surfaces of the teeth and inner surfaces of the coils; and
   an adhesive body filled in the passage,
   wherein the plate wall closes a yoke-side opening of the cavity,
   the first rib extends radially from the plate wall toward the annular member such that the first rib does not reach the annular member.

2. The stator according to claim 1 further comprising at least one second rib, wherein
   a plurality of the first ribs is provided between the first hole and the second hole,
   the second rib is provided between the first ribs, the second rib extends radially from the annular member toward the yoke such that the second rib does not reach the plate wall, and
   the first ribs and the second rib together constitute the passage that connects the first hole and the second hole.

* * * * *